United States Patent
Thompson

(10) Patent No.: US 7,358,747 B2
(45) Date of Patent: Apr. 15, 2008

(54) ROTARY POTENTIOMETER WITH SELECTABLE OPERATING SECTION

(75) Inventor: David Thompson, Christchurch (GB)

(73) Assignee: Penny & Giles Controls Limited, Cwmfelinfach, Crosskeys (GB)

(*) Notice: Subject to any disclaimer, the term of this patent is extended or adjusted under 35 U.S.C. 154(b) by 50 days.

(21) Appl. No.: 10/537,561

(22) PCT Filed: Nov. 25, 2003

(86) PCT No.: PCT/GB03/05125

§ 371 (c)(1),
(2), (4) Date: Dec. 7, 2005

(87) PCT Pub. No.: WO2004/051194

PCT Pub. Date: Jun. 17, 2004

(65) Prior Publication Data

US 2006/0132150 A1 Jun. 22, 2006

(30) Foreign Application Priority Data

Dec. 5, 2002 (GB) ................. 0228392.7

(51) Int. Cl.
G01R 27/08 (2006.01)

(52) U.S. Cl. ...................... 324/714; 324/691

(58) Field of Classification Search ............... 324/714, 324/691
See application file for complete search history.

(56) References Cited

U.S. PATENT DOCUMENTS

| 2,442,630 A | 6/1948 | Wickesser |
| 5,657,544 A | 8/1997 | Ota et al. |
| 6,331,768 B1 * | 12/2001 | Drori et al. ............. 323/369 |

FOREIGN PATENT DOCUMENTS

| EP | 0 389 669 | 10/1990 |
| GB | 2 236 191 | 3/1991 |

OTHER PUBLICATIONS

UNISIA JECS Corp., Patent Abstract of Japan, vol. 200, No. 01, Jan. 31, 2000—& JP 11 271013, Oct. 5, 1999.

* cited by examiner

*Primary Examiner*—Andrew H. Hirshfeld
*Assistant Examiner*—Amy He
(74) *Attorney, Agent, or Firm*—Gottlieb, Rackman & Reisman, P.C.

(57) ABSTRACT

A transducer in the form of a potentiometer provides an output signal indicative of a position of a component. The potentiometer comprises a body, a member moveable relative to the body and having an end portion for coupling to the component, and a resistor mounted to the body. A wiper is coupled to the member and forms a slidable electrical contact to the resistor. The potentiometer also comprises a contactor means for providing selectable contact positions to the resistor of respective first and second electrical conductors, so as to provide a selected operating section of said resistor.

12 Claims, 3 Drawing Sheets

Section on 'A---A'

ROTARY POTENTIOMETER WITH SELECTABLE OPERATING SECTION

The present invention relates to a transducer. In a particular, but not exclusively, the present invention relates to a rotary potentiomenter.

Transducers are used in a wide range of control and instrumentation applications to provide an electrical signal which is indicative of a position of a member of the transducer. Typically, the member is coupled to a moveable actuator component in a piece of machinery such as an engine, wherein the actuator component position is determined by an operating condition or parameter of the engine. A particular example is a potentiometer used in a racing car engine for providing a feedback signal indicative of a throttle position.

A rotary potentiometer has a rotatable shaft that drives a wiper. The wiper contacts and is movable across a resistor which is disposed in a circular arc around the shaft axis. Typically, the resistor is a wound wire coil. A voltage is applied across the two ends of the resistor coil and an output voltage is sensed on the wiper. The output voltage is dependent on the position of the wiper relative to the ends of the resistor.

One problem with known rotary transducers is that of backlash. The shaft member must be suitably coupled to the actuator component within the engine. For instance, in the racing car throttle example, the shaft of the potentiometer must be coupled to a butterfly valve member of the throttle. Backlash is liable to be generated in any such coupling, giving rise to inaccuracies and hysteresis in the output signal. Backlash may be reduced or eliminated by insertion of a fastener such as a screw or spring clip to hold the shaft rigidly to the component. However, engine vibrations may cause the fastener to become dislodged or fall out of the coupling into the engine, leading to engine failure.

For a rotary potentiometer, the angle of rotation of the arc through which the potentiometer wiper moves (the operating angle) may be anything from a fairly small angle (say 10°) to a large angle (say 350°). The angle required for a given transducer application depends on the angle through which the actuator component of the engine rotates. Ideally, to obtain a full range of output signal voltage, the angular positions of the ends of the resistor should correspond to the extents of angular movement of the actuator component. To satisfy demand, manufacturers of such rotary potentiometers provide a range of different products each having a different operating angle. However, conventional manufacturing constraints place a practical and/or commercial limit on the number of different products in a product range. Thus there is a limited number of different operating angles available in a given product range. This causes a design problem. The designer must make a compromise when selecting the potentiometer between the angle of rotation of the actuator component and the available operating angles of the potentiometer.

A requirement of rotary potentiometers is that the resistor is fixed relative to the housing and must remain in position throughout the operational life of the potentiometer, even where there are severe conditions such as engine vibrations. Known potentiometer resistor coils are fixed to the transducer mounting by means of an adhesive. However, adhesive bonds are liable to deteriorate and to work loose with vibrations. Furthermore, the application of adhesive in the manufacturing assembly is a time-consuming operation.

It is an aim of the present invention to provide a transducer and a rotary potentiometer which alleviates these problems.

A further aim of the present invention is to provide a rotary transducer which facilitates small angular adjustments to be made to a mounted position of the transducer.

Another aim of the present invention is to provide a transducer which is not susceptible to mechanical or electrical deterioration caused by vibrations.

Another aim of the present invention is to provide a rotary potentiometer in which the components can be quickly and conveniently assembled or replaced.

According to a first aspect of the present invention there is provided a rotary transducer for providing an output signal indicative of an angular position of a component, the transducer comprising:
  a body; and
  a shaft having an axis, the shaft being rotatable about the axis relative to the body and having an end portion for insertion into an aperture of said component,
  wherein the end portion has a plurality of segments, the segments being splayed apart from the axis so as to provide a resilient gripping action when inserted into the aperture.

Preferably the end portion is an integral part of the shaft. The resilient gripping action between the end portion of the shaft and the component forms a substantially backlash free coupling. It is an advantage that this coupling may be without additional components that could become dislodged.

Preferably the segments are provided with a bevelled end face to facilitate insertion into the aperture by squeezing of the segments toward the axis when the bevelled face is pushed against edges of the aperture.

In another aspect of the invention, embodiments have a body comprising an axially centered circular flange for mounting of the transducer by threaded fastening means. Arcuate slots may be provided in the flange for insertion of the fastening means therethrough. The arcuate slots allow for angular positional adjustment of the transducer.

Preferably the flange is further provided with mounting inserts surrounding each arcuate slot, the inserts having a face for abutting a head of a fastener when the fastener is tightened. The mounting inserts may be of a stainless steel or other durable material which resists permanent deformation when the fastener is tightened.

In prior art rotary transducers, when mounting screws are tightened the plastics material of the flange is permanently deformed leaving an indentation underneath the head of the screw. The angular position of the mounting of the transducer may be of critical importance for the required accuracy and sensitivity of the transducer. In such circumstances it is often necessary to make small adjustments to the angular position at which the transducer is mounted. However, the screws will tend to reseat in the indentations in the flange, thereby tending to move the transducer back towards its original position. The stainless steel inserts prevent the formation of permanent indentations and therefore facilitate small angular adjustments of the transducer.

In another aspect of the invention, the transducer has electrical connections for providing a supply voltage to the transducer and for providing an output signal from the transducer to an instrument panel or controller. The electrical connections are preferably provided by way of a multi-core cable which may be permanently moulded into the moulded plastics body of the transducer. It is an advantage that the electrical connection terminals can be located remotely from the transducer so that vibrations in the vicinity of the transducer cannot cause the terminal connections to become loose.

According to a further aspect of the present invention there is provided a potentiometer for providing an output signal indicative of a position of a component, the potentiometer comprising:

a body;

a member moveable relative to the body and having an end portion for coupling to said component;

a resistor mounted to the body;

a wiper coupled to the member and forming a slidable electrical contact to the resistor; and contactor means for providing selectable contact positions to said resistor of respective first and second electrical conductors, so as to provide a selected operating section of said resistor.

In a preferred embodiment, the potentiometer is a rotary potentiometer for providing an output signal indicative of an angular position of said component, wherein:

said member is a shaft having an axis, the shaft being rotatable about the axis relative to the body;

said resistor is mounted to the body in an arc around the axis; and said contactor means is operative for providing selectable contact positions to said resistor, so as to provide a selected operating angle of said potentiometer.

Preferably, the resistor comprises a resistor coil.

In a preferred embodiment, the contactor means comprises a plurality of contactor fingers, the contact point being selectable by selection of a finger and positioning of the selected finger into contact with the resistor. The contactor fingers may be fingers of a contactor plate, the selected contactor finger being positioned by bending the finger relative to the plate so as to contact the resistor. Alternatively, the contactor finger may be selected by bending unselected fingers relative to the plate so that only the selected finger contacts the resistor. Preferably, the contactor fingers are arranged around the contactor plate to provide a range of selectable operating angles between 0 and 360 degrees.

It is an advantage that a single component (the contactor plate) can be manufactured and used in potentiometers of any required operating angle. All that is required to provide a potentiometer of a required operating angle is to select the appropriate finger having the required angular position.

Conveniently, the potentiometer is provided with two contactor plates, one for connection of each of the first and second electrical conductors to the resistor. This advantageously allows for greater flexibility in the selected positions of the contacts since a contact finger on each plate can be selected. Not only is the operating angle selectable, but also the angular disposition of the operating angle relative to the body of the potentiometer is selectable.

Preferably the, or each, contactor plate is mountable to the body by press fitting over a resilient protrusion formed on the body.

In a preferred embodiment the resistor coil is mounted to the body by means of a mounting ring which clamps the coil between the mounting ring and the body. Preferably, the clamping ring is mountable to the body by press fitting over a resilient protrusion formed on the body.

It is an advantage that the use of press-fit components allows for quick and convenient assembly of the potentiometer. Components can be quickly and conveniently changed or replaced. The resistor component is fixed relative to the housing and must remain in position throughout the operational life of the component, even where there are severe conditions such as engine vibrations. A problem with prior art rotary potentiometers is that the resistor coils are fixed to the transducer mounting by means of an adhesive.

However, adhesive bonds are liable to deteriorate and to work loose with vibrations. The application of adhesive in the manufacturing assembly is a time-consuming operation. The replacement of adhesive mounted coils is also time-consuming and can be a messy procedure.

The invention will now be described by way of example with reference to the accompanying drawings in which:—

Figure 1:
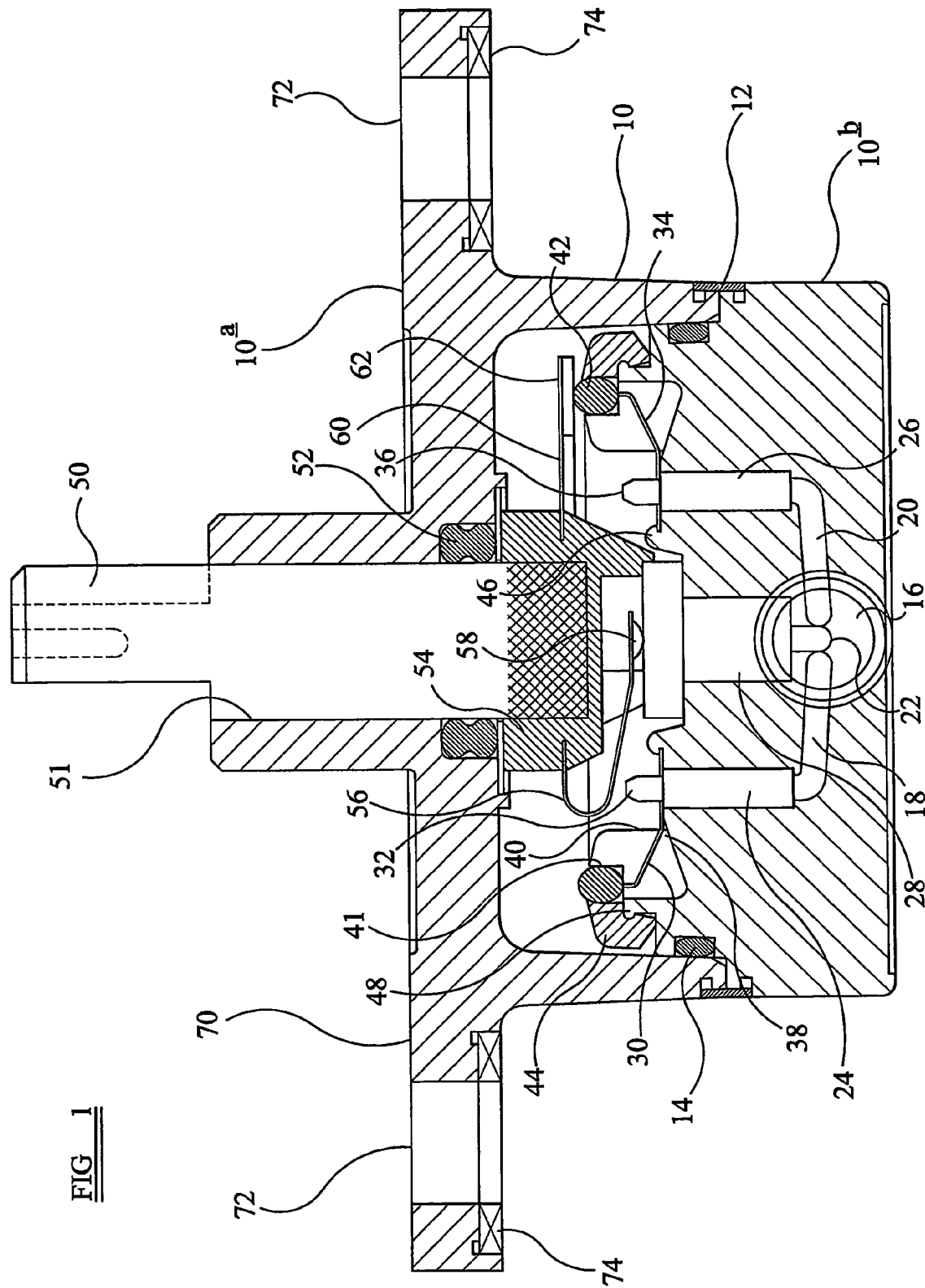
FIG. 1 is a sectional elevation of a potentiometer in accordance with the present invention.

Referring to FIG. 1, a potentiometer has a housing 10 formed from a mouldable plastics material. The housing 10 is formed of two parts, an upper housing 10a and a lower housing 10b. The potentiometer is one typically used for mounting to an engine as part of a control instrument. The potentiometer has a shaft 50 which is formed to engage an aperture in a component of the engine. The component is one which is rotatably driven to an angular position in response to a change of a physical parameter of the engine.

The lower housing 10b carries the stationary components of a potentiometer and is joined to the upper housing 10a by means of a crimped metallic ring 12. An O-ring 14 forms a seal between the upper housing 10a and lower housing 10b. The stationary electrical components of the potentiometer include three-core cable 16 containing conductor wires 18, 20 and 22. A first of the conductor wires 18 is permanently connected to a first metallic stud 24, a second of the conductors 20 is permanently connected to second metallic stud 26 and a third of the conductors 22 is permanently connected to a central metallic boss 28. The three core cable 16, the first and second metallic studs 24, 26 and the metallic boss 28 are all moulded into the housing, thereby providing a seal against ingress of moisture or dirt.

A first contact plate 30 is mounted for electrical contact onto a first pin 32 on the first metallic stud 24. Similarly, a second contact plate 34 is mounted on a pin 36 on the second metallic stud 26. The first and second pins 32, 36 on the first and second metallic studs 24, 26 protrude above an internal surface 38 formed in the lower housing 10b.

The lower housing 10b includes a plurality of equally spaced partition arms 40 which extend radially inwardly toward a central axis of the housing and provide inner support mounts 41 for a resistor coil 42. The resistor coil 42 is in the shape of an incomplete toroidal coil, forming at least 350° of a complete toroid. The resistor coil 42 is held in position by a mounting ring 44 so as to be clamped between the mounting ring 44 and the support mounts 41.

The upper housing 10a supports the movable components of the potentiometer, which include a cylindrical shaft 50 mounted in a bore 51 formed in the upper housing 10a so as to be axially rotatable within the bore 51. A cylindrical shaft seal 52 forms the seal between the shaft 50 and the upper housing 10a. A wiper carrier 54 is mounted to the shaft 50 at its lower end as shown in FIG. 1. The wiper carrier 54 carries a metallic spring contact 56, which provides a resilient biasing action to maintain contact between a precious metal bead 58 and an upper surface of the metal boss 28. The spring contact 56 and precious metal bead are electrically conductive, and form an integral component with a potentiometer wiper arm 60. The wiper arm 60 has a precious metal contact 62 that forms a slidable contact with the resistor coil 42.

The upper housing 10a is further provided with a flange 70 extending radially beyond the lower housing 10b. Arc-shaped slots 72 are formed in the flange 70 for receiving screws or bolts for mounting the potentiometer by screwing into mounting holes provided at a mounting location on the engine.

Figure 2:
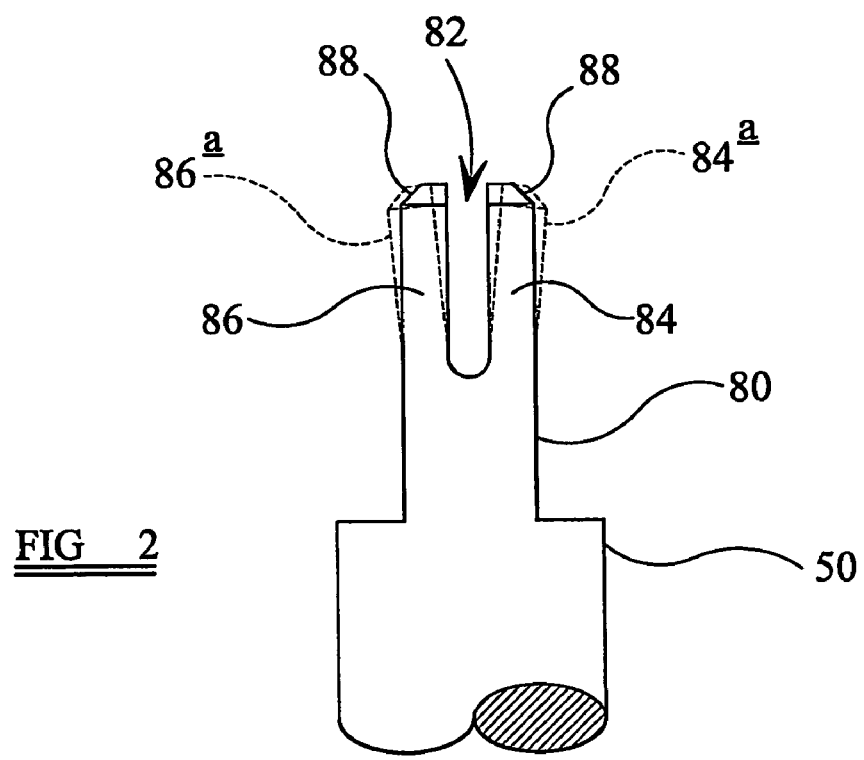
FIG. 2 is a detailed view of part of a shaft forming part of the potentiometer of FIG. 1.

Referring to FIG. 2, the shaft 50 of the potentiometer of FIG. 1 has an end portion 80 which is formed to engage a circular aperture in the engine component. The end portion 80 has a pair of laterally opposed arms 84, 86 separated by a slot 82. As shown in exaggerated form in FIG. 2 by the broken lines 84a, 86a, the shaft 50 is formed with the arms 84, 86 splayed radially outwards. The extended portion 18 of the shaft 50 has a bevelled end 88. When assembling the potentiometer into the engine, the bevelled edges 88 are inserted into the opening in the component such that the splayed apart arms 84, 86 are pushed inwards as the end 80 is inserted further into the opening in the component. After insertion, the arms 84, 86 exert a resilient biasing force radially outwards so as to hold the end 80 of the shaft 50 in permanent engagement in the component. The resilient engagement force ensures that there is no backlash between the rotational movement of the engine component and the shaft. Furthermore, there are no screws, clips or other components which might become detached in use and fall into the engine causing damage.

Figure 3:
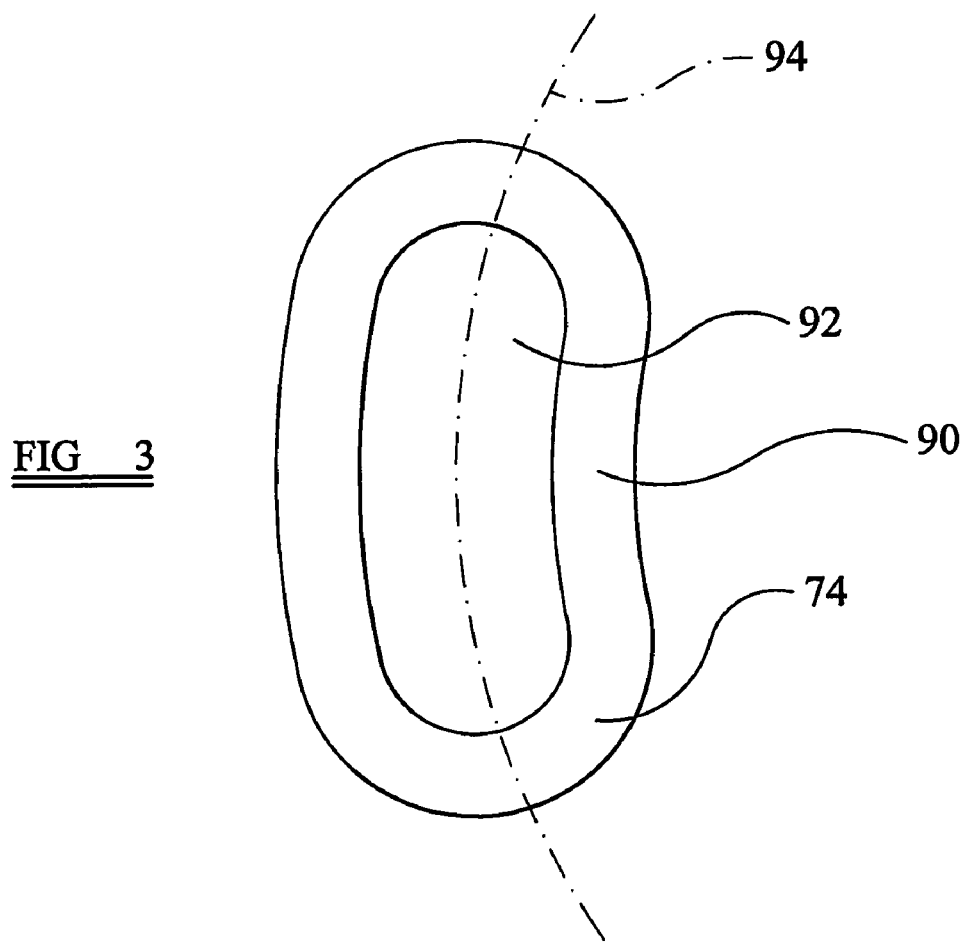
FIG. 3 is a mounting insert for use with the potentiometer of FIG. 1.

Referring to FIG. 3, the mounting insert 74 of the potentiometer of FIG. 1 is of a kidney shape having a solid portion 90 surrounding an opening 92. The opening 92 lies symmetrically and centrally within the surround and the mounting 74 and is substantially the same shape and size as each of the arc-shaped slots 72 in the mounting flange 70. Typically the mounting insert 74 is fabricated from 0.75 mm thick stainless steel.

In use, when the potentiometer is mounted to the engine, screws are inserted into threaded holes in the engine, the screws passing through the slots 72 in the potentiometer flange 70. The screws are tightened such that their heads abut the mounting inserts 74 at each slot 72 position. When tightened, the stainless steel material resists permanent deformation by the tightening force on the screw head. This means that when the screws are loosened the angle of the potentiometer mounting can be adjusted by rotating the flange so that the screws adopt new positions within the slots 72. On subsequent retightening of the screws the screw heads tighten against a new position on the mounting insert 74, ensuring that the potentiometer adopts the correct new position.

Figure 4:
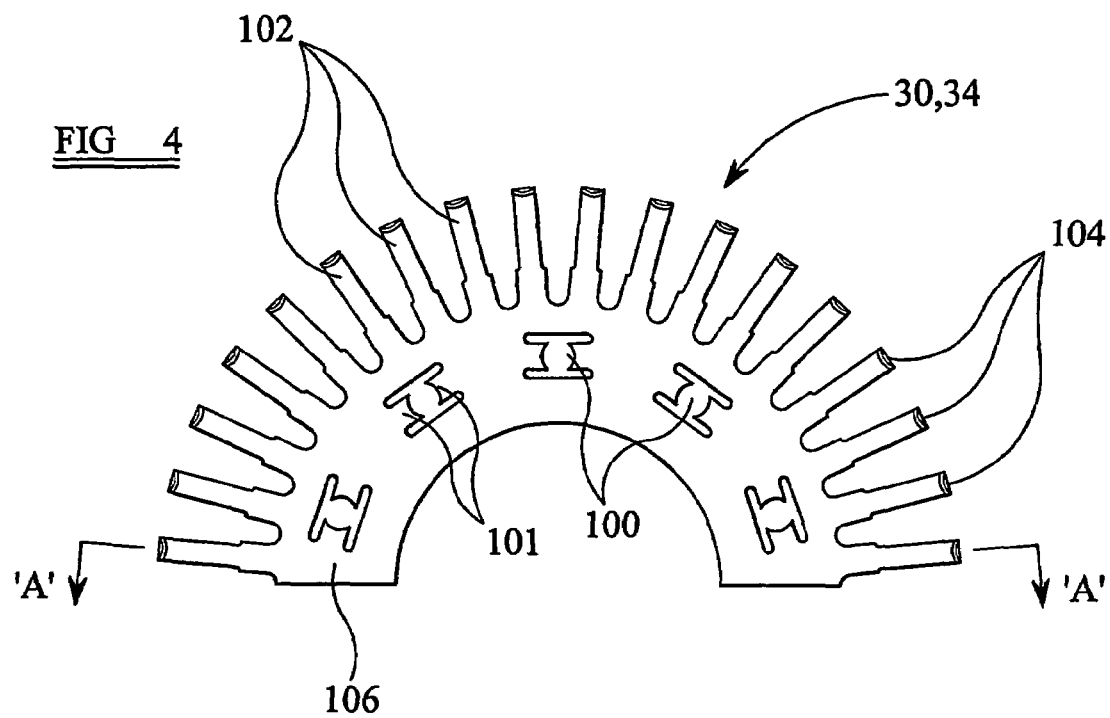
FIG. 4 is a view of a contact plate forming part of the potentiometer of FIG. 1.

Referring to FIG. 4, each of the contact plates 30, 34 of the potentiometer of FIG. 1 is a pressed metal component having openings 100 through any one of which one of the pins 32, 36 is inserted when the contact plate 30, 34 is mounted in the potentiometer. Each of the openings 100 is provided with a pair of opposed tongues 101 which are spaced apart with a separation that is slightly less than the diameter of the pins 32, 36. When inserted, the studs displace the tongues 101 and this displacement causes a resilient force against the sides of the stud 32, 36 to provide both a fixed mounting of the plate on the stud and an electrical contact between the stud and the plate. Each contact plate forms an arc of slightly less than 180°. Around the periphery of the contact plate are a plurality of fingers extending radially outwards. Each finger is spaced apart from the next by an angle of 10° so that there are 18 fingers on each contact plate. Each of the fingers is provided with an upturned outer end 104.

Figure 5:
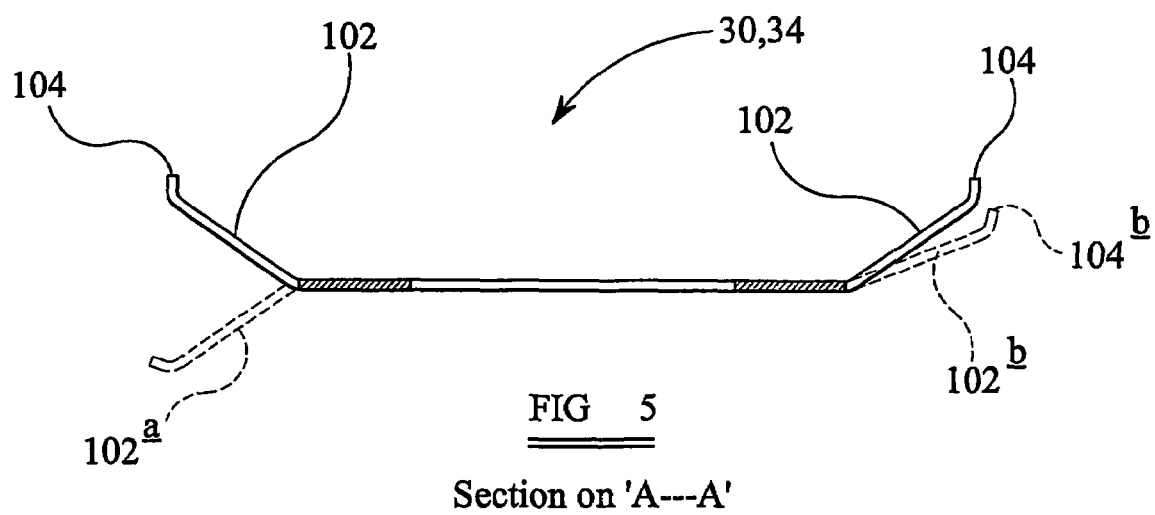
FIG. 5 is a sectional view taken along the line A-A of FIG. 4.

Referring now to FIG. 5, each of the fingers 102 shown in FIG. 4 is formed so as to be angled upwardly (as shown in FIG. 5) from the central portion 106 of the contact plate 30, 34.

When each of the contact plates 30, 34 is assembled onto a respective pin 32, 36, one of the fingers 102 is selected as the contact point for contacting the resistor coil 42 of the potentiometer. All of the other fingers 102 are bent back in the position shown by the broken line 102a. The finger which forms the contact point contacts the resistor coil as shown in FIG. 1. When the resistor coil is mounted into the potentiometer the contacting finger 102 is displaced downwards as shown in FIG. 5 by the broken line 102b. The displacement causes a resilient biasing force ensuring that an electrical contact is maintained between the upturned end 104b of the contacting finger and the resistor coil 42.

When the contact plates are assembled into the potentiometer the operating angle of the potentiometer is selected by choosing an appropriate pair of fingers, one on each of the contact plates 30, 34. Thus it can be seen that any operating angle between 10° and 350° (inclusive) in multiples of 10° may be selected. The components used are the same whatever operating angle is selected.

Furthermore, it may be possible to select fingers at more than one angular position for a pair of fingers to have a given angle between them. It is thus possible to select the angular disposition of the operating angle relative to the body of the potentiometer.

Referring again to FIG. 1 the electrical contacts to the potentiometer are formed by way of a three core cable 16 carrying conductors 18, 20, 22 each of which forms an electrical contact with either the contact plate 30, 34 and thereby by way of a finger 102 of the contact plate to one end of the selected operating angle on the resistor coil 42. The third conductor 22 forms an electrical contact by way of the boss 28, precious metal bead 58 and spring contact 56 to the precious metal wiper contact 62 of the potentiometer. A fixed voltage is applied across the first and second conductors 18, 20 so that a current flows through the selected portion of the resistor coil 42. The angular position of the potentiometer shaft 50 determines a point of contact between the wiper contact 62 and the resistor coil 42. Thus, a current will flow through the wiper contact to the third conductor 22 of the three-core cable. The current flowing in the third conductor therefore provides an output signal for the potentiometer. The amount of current flowing in the conductor 22 (and therefore the voltage seen on the conductor 22) depends on the relative position of the wiper 60 with respect to the two contact points between the fingers 102 on the contact plates 30, 34 and the resistor coil 42.

The potentiometer of FIG. 1 is manufactured in a simple and convenient manner by assembly of a group of components. The lower housing 10b contains the three-core cable 16 with the conductors 18, 20, 22, the contact pins 24, 26 and the central boss 28 all integrally formed in the moulded plastics component. The lower housing 10b is shaped to include push fit receiving lugs 46 for receiving the contact plates 30, 34, and a further circumferentially extending push fit lug 48 for receiving the mounting ring 44 which holds the resistor coil in place. Thus, the contact plates 30, 34 as well as the resistor coil 42 and mounting ring 44 are simply mounted to the lower housing by press fitting onto the respective lugs 46, 48 and the contact studs 32, 36.

The shaft 50, wiper carrier 54, spring contact 56 and wiper 60 are mounted in the upper housing 10a which is then lowered onto the lower housing 10b so that the precious metal bead 58 contacts the conductive boss 28, the precious metal wiper contact 62 contacts the resistor coil 42 and the upper housing 10a engages the lower housing 10b to form a seal against the O-ring 14. Finally, the upper housing 10a is pushed over the O-ring seal 41 onto the lower housing 10b and the two housings 10a, 10b are held together crimping of the metal ring 12. The complete assembly is a sealed unit with the electrical components sealed into the body 10 and protected from ingress of moisture or dirt.

Thus it can be seen that a quick and convenient assembly process is provided for potentiometers having a wide range of selectable operating angles and which can be accurately mounted in position on an engine or other piece of machinery and readily adjusted for adopting a correct or desired angular position.

The transducer in the example described above is a rotary potentiometer. However, the invention is not limited to such a transducer. It will be appreciated that many of the principles of the invention may be equally applied to linear transducers and linear potentiometers.

The invention claimed is:

1. A potentiometer for providing an output signal indicative of a position of a component, the potentiometer comprising:
   a body;
   a member moveable relative to the body and having an end portion for coupling to said component;
   a resistor mounted to the body;
   a wiper coupled to the member and forming a slidable electrical contact to the resistor; and
   a contactor plate having a plurality of selectable conductive contactor fingers for providing selectable contact positions to said resistor of respective first and second electrical conductors, so as to provide a selected operating section of said resistor, wherein a contact position is selectable by bending of one or more contactor fingers relative to the plate.

2. The potentiometer of claim 1, wherein:
   the potentiometer is a rotary potentiometer for providing an output signal indicative of an angular position of said component;
   said member is a shaft having an axis, the shaft being rotatable about the axis relative to the body;
   said resistor is mounted to the body in an arc around the axis; and
   said contactor plate is operative for providing selectable contact positions to said resistor, so as to provide a selected operating angle of said potentiometer.

3. The potentiometer of claim 1, wherein the resistor comprises a resistor coil.

4. The potentiometer of claim 3, wherein the resistor coil is mounted to the body by means of a clamping ring which clamps the coil between the mounting ring and the body.

5. The potentiometer of claim 4, wherein the clamping ring is mountable to the body by press fitting over a resilient protrusion formed on the body.

6. The potentiometer of claim 1, wherein each contact position is selectable by selection of a conductive contactor finger such that only the selected contactor finger contacts the resistor.

7. The potentiometer of claim 1, wherein the selected contactor finger is positioned by bending the finger relative to the plate so as to contact the resistor.

8. The potentiometer of claim 7, wherein the contactor fingers are arranged around the contactor plate to provide a range of selectable operating angles.

9. The potentiometer of claim 8, wherein the contactor plate is mountable to the body by press fitting over a resilient protrusion formed on the body.

10. The potentiometer of claim 1, wherein the selected contactor finger is positioned by bending unselected fingers relative to the plate so that only the selected finger contacts the resistor.

11. The potentiometer of claim 1, wherein the potentiometer is provided with two contactor plates, one for connection of each of the first and second electrical conductors to the resistor.

12. The potentiometer of claim 11, wherein each contactor plate is mountable to the body of the potentiometer by press fitting over a resilient protrusion formed on the body.

* * * * *